United States Patent
Kobayashi et al.

(10) Patent No.: US 11,471,835 B2
(45) Date of Patent: Oct. 18, 2022

(54) MANAGEMENT DEVICE FOR WATER TREATMENT FACILITY, CLEANING CHEMICAL SOLUTION ORDER PLACEMENT SYSTEM FOR WATER TREATMENT FACILITY, CHEMICAL SOLUTION ORDER PLACEMENT METHOD FOR WATER TREATMENT FACILITY, AND CHEMICAL SOLUTION CLEANING PLANNING METHOD FOR WATER TREATMENT FACILITY

(71) Applicant: KUBOTA CORPORATION, Osaka (JP)

(72) Inventors: Hiroyuki Kobayashi, Amagasaki (JP); Nobukazu Suzuki, Amagasaki (JP); Kouji Miyagawa, Amagasaki (JP); Yasuhiro Kaneshina, Amagasaki (JP)

(73) Assignee: KUBOTA CORPORATION, Osaka (JP)

( * ) Notice: Subject to any disclaimer, the term of this patent is extended or adjusted under 35 U.S.C. 154(b) by 106 days.

(21) Appl. No.: 16/772,363

(22) PCT Filed: Nov. 22, 2018

(86) PCT No.: PCT/JP2018/043135
§ 371 (c)(1),
(2) Date: Jun. 12, 2020

(87) PCT Pub. No.: WO2019/116850
PCT Pub. Date: Jun. 20, 2019

(65) Prior Publication Data
US 2021/0069652 A1 Mar. 11, 2021

(30) Foreign Application Priority Data
Dec. 13, 2017 (JP) .............................. JP2017-238662

(51) Int. Cl.
*B01D 65/02* (2006.01)
*B01D 65/08* (2006.01)
(Continued)

(52) U.S. Cl.
CPC ............. *B01D 65/02* (2013.01); *B01D 65/08* (2013.01); *C02F 1/008* (2013.01); *C02F 1/44* (2013.01);
(Continued)

(58) Field of Classification Search
None
See application file for complete search history.

(56) References Cited

U.S. PATENT DOCUMENTS

2005/0139530 A1* 6/2005 Heiss ........................ C02F 9/00
210/85
2013/0075331 A1 3/2013 Peiris et al.

FOREIGN PATENT DOCUMENTS

CN 105084520 A 11/2015
CN 105217881 A 1/2016
(Continued)

OTHER PUBLICATIONS

Mar. 9, 2018 Office Action issued in Japanese Patent Application No. 2017-238662.
(Continued)

*Primary Examiner* — Richard C Gurtowski
(74) *Attorney, Agent, or Firm* — Oliff PLC

(57) ABSTRACT

A management device for a water treatment facility includes: a transmembrane pressure difference prediction unit configured to predict a general trend in a transmembrane pressure difference in a water treatment system based on an operation information, the operation information being related to the water treatment system including a membrane separation device installed therein; a chemical
(Continued)

solution cleaning planning unit configured to devise such a chemical solution cleaning plan that chemical solution cleaning is performed before a period when a value of the transmembrane pressure difference predicted reaches a specified value; and a chemical solution order placement information generation unit configured to generate chemical solution order placement information based on the and the cleaning chemical solution stock information.

18 Claims, 8 Drawing Sheets

(51) Int. Cl.
    *C02F 1/00*     (2006.01)
    *C02F 1/44*     (2006.01)
    *G05B 19/042*     (2006.01)
    *G06Q 10/06*     (2012.01)
    *G06Q 10/08*     (2012.01)
    *G01K 13/02*     (2021.01)

(52) U.S. Cl.
    CPC ..... *G05B 19/042* (2013.01); *G06Q 10/06315* (2013.01); *G06Q 10/087* (2013.01); *B01D 2321/16* (2013.01); *B01D 2321/40* (2013.01); *C02F 2209/02* (2013.01); *C02F 2209/03* (2013.01); *C02F 2209/04* (2013.01); *C02F 2209/06* (2013.01); *C02F 2209/08* (2013.01); *C02F 2209/11* (2013.01); *C02F 2209/14* (2013.01); *C02F 2209/20* (2013.01); *C02F 2209/40* (2013.01); *C02F 2303/16* (2013.01); *G01K 13/02* (2013.01); *G01K 13/026* (2021.01); *G05B 2219/2605* (2013.01)

(56) References Cited

FOREIGN PATENT DOCUMENTS

| | | | |
|---|---|---|---|
| CN | 106512745 | A | 3/2017 |
| JP | 3442354 | B2 | 9/2003 |
| JP | 2003-311261 | A | 11/2003 |
| JP | 2004-136229 | A | 5/2004 |
| JP | 2004-230222 | A | 8/2004 |
| JP | 2009-262134 | A | 11/2009 |
| JP | 2016-172213 | A | 9/2016 |
| JP | 2016-172216 | A | 9/2016 |
| JP | 2017-018940 | A | 1/2017 |
| WO | 2011-153625 | A2 | 12/2011 |

OTHER PUBLICATIONS

May 22, 2018 Office Action issued in Japanese Patent Application No. 2017-238662.
Feb. 19, 2019 International Search Report issued in International Patent Application No. PCT/JP2018/043135.
Jun. 16, 2020 International Preliminary Reporton Patentability issued in International Patent Application No. PCT/JP2018/043135.
Nov. 17, 2021 Office Action issued in Chinese Patent Application No. 201880072575.0.

* cited by examiner

MANAGEMENT DEVICE FOR WATER TREATMENT FACILITY, CLEANING CHEMICAL SOLUTION ORDER PLACEMENT SYSTEM FOR WATER TREATMENT FACILITY, CHEMICAL SOLUTION ORDER PLACEMENT METHOD FOR WATER TREATMENT FACILITY, AND CHEMICAL SOLUTION CLEANING PLANNING METHOD FOR WATER TREATMENT FACILITY

TECHNICAL FIELD

The present invention relates to management devices for a water treatment facility, cleaning chemical solution order placement systems for a water treatment facility, chemical solution order placement methods for a water treatment facility, and chemical solution cleaning planning methods for a water treatment facility.

BACKGROUND ART

Patent Literature 1 proposes a method of maintaining and managing a submerged membrane separation device. The method determines a time to replace a membrane cartridge in the submerged membrane separation device on the basis of the actuation pressure and the amount of permeate of the membrane cartridge and processes a placement of an order for a replacement membrane cartridge.

This maintaining and managing method uses, as indices, the actuation pressure exerted on the surface of a membrane in the membrane cartridge and the measured amount of permeate through a treated water removal system. The method is configured to evaluate the operating condition of the submerged membrane separation device and the characteristics of activated sludge by applying the indices to data on correlation between (i) the empirically predetermined actuation pressure and amount of permeate and (ii) the operating condition of the submerged membrane separation device and the characteristics of activated sludge.

The method then determines a chemical solution cleaning period and whether the membrane cartridge needs to be replaced on the basis of a result of the evaluation. The method is further configured to transmit the result of the evaluation and a decision to a local maintenance and management service provider over a communication link and to instruct a parts center over a communication link to dispatch a replacement membrane cartridge.

In other words, the method is configured to evaluate the operating condition of the submerged membrane separation device and the characteristics of activated sludge by means of a computer in a central monitoring center, and thereby to monitor the operating status of each water treatment facility equipped with a submerged membrane separation device in a centralized manner.

CITATION LIST

Patent Literature

Patent Literature 1: Japanese Patent No. 3442354

SUMMARY OF INVENTION

Technical Problem

The conventional method of maintaining and managing a submerged membrane separation device, however, determines a chemical solution cleaning period and whether the membrane cartridge needs to be replaced on the basis of empirically derived correlation data. Therefore, the method has a problem that the method falls short of properly coping with non-steady situations where empirical laws do not apply, for example, where there occurs an abrupt rise in the transmembrane pressure difference.

Meanwhile, a typical water treatment facility using a membrane separation device is provided with a plurality of water treatment systems. When the transmembrane pressure difference increases at the end of each prescribed one- or two-months operating time, the conventional method of maintaining and managing a submerged membrane separation device determines, without exception on the basis of empirical laws, that a chemical solution cleaning time has been reached. For these reasons, the facility operator needs to stock up on the cleaning chemical solution in preparation for overlapping chemical solution cleaning periods of the membrane separation devices in the systems.

In view of these problems, it is an object of the present invention to provide a management device for a water treatment facility, a cleaning chemical solution order placement system for a water treatment facility, a chemical solution order placement method for a water treatment facility, and a chemical solution cleaning planning method for a water treatment facility, the device, system, and methods being capable of determining a suitable cleaning period even in non-steady situations and preventing an excess stock of the cleaning chemical solution.

Solution to Problem

A management device for a water treatment facility in accordance with the present invention, to achieve the object, has a first feature that the management device is for a water treatment facility including a plurality of water treatment systems each using a membrane separation device, the management device including: a water treatment facility information reception unit configured to receive operation information and cleaning chemical solution stock information transmitted from a management terminal via a communication medium, the operation information being related to each of the plurality of water treatment systems each including the membrane separation device installed therein, the management terminal being configured to manage the operation information; a transmembrane pressure difference prediction unit configured to predict a general trend in a transmembrane pressure difference in each of the plurality of water treatment systems based on the operation information; a chemical solution cleaning planning unit configured to devise such a chemical solution cleaning plan that chemical solution cleaning is performed before a period when a value of the transmembrane pressure difference or a rate of change thereof predicted in each of the plurality of water treatment systems by the transmembrane pressure difference prediction unit reaches a specified value; an operating conditions adjustment information generation unit configured to generate operating conditions adjustment information based on which a specified-value reaching period of the transmembrane pressure difference in each of the plurality of water treatment systems is adjusted to be earlier or later than predicted in such a manner that there is no overlap between the specified-value reaching periods of the transmembrane pressure differences predicted in the plurality of water treatment systems by the transmembrane pressure difference prediction unit; and an operating conditions adjustment information transmission unit configured to transmit the operating conditions adjustment information to the management terminal, wherein the chemical solution cleaning planning unit devises the chemical solution cleaning plan by taking the operating conditions adjustment information into account.

The transmembrane pressure difference prediction unit predicts a general trend in the transmembrane pressure difference in each water treatment system including a membrane separation device installed therein on the basis of the operation information received via the water treatment facility information reception unit from the management terminal configured to manage the operation information related to the water treatment systems. The chemical solution cleaning planning unit devises such a chemical solution cleaning plan that chemical solution cleaning is performed before a period when a predicted value of the general trend of the transmembrane pressure difference or a predicted rate of change thereof reaches a specified value. Therefore, situations are prevented from occurring where the transmembrane pressure difference abnormally rises.

The operating conditions adjustment information generated by the operating conditions adjustment information generation unit is transmitted to each management terminal to adjust operating conditions for the water treatment systems in the water treatment facility operating under the management of the management terminal. As a result, the specified-value reaching period of the transmembrane pressure difference predicted by the transmembrane pressure difference prediction unit is adjusted to be earlier or later than predicted. The chemical solution cleaning planning unit then devises a chemical solution cleaning plan by taking the operating conditions adjustment information into account.

For instance, the operating conditions adjustment information generation unit generates operating conditions adjustment information for each water treatment system in such a manner that there is no overlap between the specified-value reaching periods of the transmembrane pressure differences in the water treatment systems, to adjust operating conditions for the water treatment systems in the water treatment facility operating under the management of the management terminal. As a result, the specified-value reaching period of the transmembrane pressure difference predicted in each water treatment system by the transmembrane pressure difference prediction unit is adjusted to be earlier or later than predicted so that there is no overlap between the specified-value reaching periods.

The chemical solution cleaning planning unit then devises a chemical solution cleaning plan by taking the operating conditions adjustment information into account. Therefore, there is no need to have a large amount of chemical solution in stock in a large storage space. The amount of the chemical solution in stock can be hence reduced to a minimum.

The management device for a water treatment facility in accordance with the present invention has, in addition to the first feature above, a second feature that the management device further includes: a chemical solution order placement information generation unit configured to generate chemical solution order placement information based on the chemical solution cleaning plan and the cleaning chemical solution stock information; and a chemical solution order placement information transmission unit configured to transmit the chemical solution order placement information generated by the chemical solution order placement information generation unit to an external device including the management terminal.

Chemical solution order placement information needed by the chemical solution order placement information generation unit is generated based on the cleaning chemical solution stock information received from the management terminal via the water treatment facility information reception unit and based also on the chemical solution cleaning plan devised by the chemical solution cleaning planning unit. The chemical solution order placement information is transmitted from the chemical solution order placement information transmission unit to an external device including the management terminal. It is hence appreciated in advance when and in what amount the chemical solution will be needed in each water treatment system. That in turn enables an order for the chemical solution to be placed in time for the execution of the cleaning plan, thereby eliminating the need to have an excess stock.

The management device for a water treatment facility in accordance with the present invention has a third feature that the management device is for a water treatment facility including a management terminal configured to manage operation information related to a plurality of water treatment systems each including a membrane separation device installed therein, the management device including: a water treatment facility information collecting unit configured to collect the operation information and cleaning chemical solution stock information related to each of the plurality of water treatment systems each including the membrane separation device installed therein; a transmembrane pressure difference prediction unit configured to predict a general trend in a transmembrane pressure difference in each of the plurality of water treatment systems based on the operation information; a chemical solution cleaning planning unit configured to devise such a chemical solution cleaning plan that chemical solution cleaning is performed before a period when a value of the transmembrane pressure difference or a rate of change thereof predicted in each of the plurality of water treatment systems by the transmembrane pressure difference prediction unit reaches a specified value; an operating conditions adjustment information generation unit configured to generate operating conditions adjustment information based on which a specified-value reaching period of the transmembrane pressure difference in each of the plurality of water treatment systems is adjusted to be earlier or later than predicted in such a manner that there is no overlap between the specified-value reaching periods of the transmembrane pressure differences predicted in the plurality of water treatment systems by the transmembrane pressure difference prediction unit; and an operating conditions adjustment information transmission unit configured to transmit the operating conditions adjustment information to the management terminal, wherein the chemical solution cleaning planning unit devises the chemical solution cleaning plan by taking the operating conditions adjustment information into account.

The management device described in the first feature above devises a chemical solution cleaning plan for each water treatment facility, and generates chemical solution order placement information, on the basis of the operation information and cleaning chemical solution stock information received via a communication medium from the management terminal in each water treatment facility. In contrast, according to the third feature, the management terminal in each water treatment facility functions as the management device described in the first feature, and devises the chemical solution cleaning plan by taking into account the operating conditions adjustment information based on which the specified-value reaching period of the transmembrane pressure difference is adjusted to be earlier or later than predicted. Therefore, there is no need to have a large amount of chemical solution in stock in a large storage space. The amount of the chemical solution in stock can be hence reduced to a minimum.

The management device for a water treatment facility in accordance with the present invention has, in addition to the third feature above, a fourth feature that the management device further includes a chemical solution order placement information generation unit configured to generate chemical solution order placement information based on the chemical solution cleaning plan and the cleaning chemical solution stock information.

It is appreciated in advance when and in what amount the chemical solution will be needed in each water treatment system in the water treatment facility under the management of the management terminal. That in turn enables an order for the chemical solution to be placed in time for the execution of the cleaning plan, thereby eliminating the need to have an excess stock.

The management device for a water treatment facility in accordance with the present invention has, in addition to any of the first to fourth features above, a fifth feature that the operating conditions adjustment information includes any of a flux, an amount of extracted excess sludge, an amount of circulated sludge, an amount of aeration, and a chemical solution cleaning period.

Any of a flux, an amount of extracted excess sludge, an amount of circulated sludge, an amount of aeration, and a chemical solution cleaning period can be suitably used as one of the operating conditions for each water treatment system. As an example, the changes in the transmembrane pressure difference can be adjusted to either speed up or slow down by increasing or decreasing the flux in the membrane separation device. As another example, by increasing or decreasing the amount of extracted excess sludge, the BOD load can be rendered adjustable so that, for example, the amount of existent fouling material can be adjusted.

The management device for a water treatment facility in accordance with the present invention has, in addition to the second feature above, a sixth feature that the external device includes any of the management terminal, a management service provider terminal for the water treatment facility, and a chemical solution supplier terminal.

The chemical solution can be obtained in a suitable manner by transmitting the chemical solution order placement information to any of the management terminal, a management service provider terminal for the water treatment facility, and a chemical solution supplier terminal.

The management device for a water treatment facility in accordance with the present invention has, in addition to any of the first to sixth features above, a seventh feature that the operation information includes any of the transmembrane pressure difference, a flux, water temperature, an amount of aeration, turbidity, an amount of treated water, pH, DO, an ORP, MLSS, TOC, COD, BOD, and a concentration of $NH_3$ in the plurality of water treatment systems or a combination thereof.

Any of the transmembrane pressure difference, a flux, water temperature, an amount of aeration, turbidity, an amount of treated water, pH, DO, an ORP, MLSS, TOC, COD, BOD, and a concentration of $NH_3$ in the plurality of water treatment systems or a combination thereof can be suitably used as the operation information needed to predict a general trend in the transmembrane pressure difference in each water treatment system.

The management device for a water treatment facility in accordance with the present invention has, in addition to any of the first to seventh features above, an eighth feature that the chemical solution cleaning planning unit decides on a type of a chemical solution for use in the chemical solution cleaning from an increasing trend in the transmembrane pressure differences predicted by the transmembrane pressure difference prediction unit and/or from an increasing trend in the transmembrane pressure differences contained in the operation information.

An increasing trend in the transmembrane pressure differences predicted by the transmembrane pressure difference prediction unit and/or an increasing trend in the transmembrane pressure differences contained in the operation information enable(s) proper determination as to, for example, which of a chemical solution, such as hydrochloric acid, oxalic acid, or citric acid, that is effective to an inorganic fouling material or a chemical solution, such as sodium hypochlorite, that is effective to an organic fouling material is preferable as a chemical solution for use in chemical solution cleaning.

A cleaning chemical solution order placement system for a water treatment facility in accordance with the present invention has a feature, as described in claim 9, that the system includes: the management device for a water treatment facility having the second feature above; the management terminal configured to manage the operation information related to the plurality of water treatment systems each including the membrane separation device installed therein and to transmit the operation information and the cleaning chemical solution stock information to the management device; and a chemical solution supplier terminal configured to arrange a supply of a chemical solution based on the chemical solution order placement information transmitted from the management device, the management device, the management terminal, and the chemical solution supplier terminal being connected in a communicable manner.

The management device for a water treatment facility having the second feature, the management terminal configured to transmit the operation information and the cleaning chemical solution stock information to the management device, and the chemical solution supplier terminal configured to arrange a supply of a chemical solution based on the chemical solution order placement information transmitted from the management device are connected in a communicable manner. This communicable connection enables a cleaning chemical solution order placement system capable of determining a suitable cleaning period even in non-steady situations and preventing an excess stock of the cleaning chemical solution.

A chemical solution order placement method for a water treatment facility in accordance with the present invention has a first feature that the method includes: an operation information transmission step of transmitting operation information and cleaning chemical solution stock information from a management terminal to a management device via a communication medium, the operation information being related to a plurality of water treatment systems each including a membrane separation device installed therein, the management terminal being configured to manage the operation information; a transmembrane pressure difference prediction step, performed by a transmembrane pressure difference prediction unit provided in the management device, of predicting a general trend in a transmembrane pressure difference in each of the plurality of water treatment systems based on the operation information; a chemical solution cleaning planning step, performed by a chemical solution cleaning planning unit provided in the management device, of devising such a chemical solution cleaning plan that chemical solution cleaning is performed before a period when a value of the transmembrane pressure difference or a rate of change thereof predicted in each of the plurality of water treatment systems in the transmembrane pressure difference prediction step reaches a specified value; a chemical solution order placement information generation step, performed by a chemical solution order placement information generation unit provided in the management device, of generating chemical solution order placement information based on the chemical solution cleaning plan and the cleaning chemical solution stock information; an operating conditions adjustment information generation step of generating operating conditions adjustment information based on which a specified-value reaching period of the transmembrane pressure difference in each of the plurality of water treatment systems is adjusted to be earlier or later than predicted in such a manner that there is no overlap between the specified-value reaching periods of the transmembrane pressure differences predicted in the plurality of water treatment systems in the transmembrane pressure difference prediction step; and an operating conditions adjustment information transmission step of transmitting the operating conditions adjustment information generated in the operating conditions adjustment information generation step to the management terminal, wherein the chemical solution cleaning planning step devises the chemical solution cleaning plan by taking the operating conditions adjustment information generated in the operating conditions adjustment information generation step into account.

The chemical solution order placement method for a water treatment facility in accordance with the present invention has, in addition to the first feature above, a second feature that the method includes: a chemical solution order placement information transmission step, performed by a chemical solution order placement information transmission unit provided in the management device, of transmitting the chemical solution order placement information generated in the chemical solution order placement information generation step to an external device including the management terminal; and a cleaning chemical solution dispatch processing step, performed by a chemical solution supplier terminal, of processing a dispatch of a cleaning chemical solution to the water treatment facility including the plurality of water treatment systems based on the chemical solution order placement information received from the management device or from the management terminal.

Another chemical solution order placement method for a water treatment facility in accordance with the present invention has a third feature that the method includes: an operation information collecting step of collecting, in a management device, operation information and cleaning chemical solution stock information related to a plurality of water treatment systems each including a membrane separation device installed therein; a transmembrane pressure difference prediction step, performed by a transmembrane pressure difference prediction unit provided in the management device, of predicting a general trend in a transmembrane pressure difference in each of the plurality of water treatment systems based on the operation information; an chemical solution cleaning planning step, performed by a chemical solution cleaning planning unit provided in the management device, of devising such a chemical solution cleaning plan that chemical solution cleaning is performed before a period when a value of the transmembrane pressure difference or a rate of change thereof predicted in each of the plurality of water treatment systems in the transmembrane pressure difference prediction step reaches a specified value; a chemical solution order placement information generation step, performed by a chemical solution order placement information generation unit provided in the management device, of generating chemical solution order placement information based on the chemical solution cleaning plan and the cleaning chemical solution stock information; and an operating conditions adjustment information generation step of generating operating conditions adjustment information based on which a specified-value reaching period of the transmembrane pressure difference in each of the plurality of water treatment systems is adjusted to be earlier or later than predicted in such a manner that there is no overlap between the specified-value reaching periods of the transmembrane pressure differences predicted in the plurality of water treatment systems in the transmembrane pressure difference prediction step, wherein the chemical solution cleaning planning step devises the chemical solution cleaning plan by taking the operating conditions adjustment information generated in the operating conditions adjustment information generation step into account.

The chemical solution order placement method for a water treatment facility in accordance with the present invention has, in addition to the third feature above, a fourth feature that the method includes: a chemical solution order placement information transmission step, performed by a chemical solution order placement information transmission unit provided in the management device, of transmitting the chemical solution order placement information generated in the chemical solution order placement information generation step to an external device including a chemical solution supplier terminal; and a cleaning chemical solution dispatch processing step, performed by the chemical solution supplier terminal, of processing a dispatch of a cleaning chemical solution to the water treatment facility including the plurality of water treatment systems based on the chemical solution order placement information received from the management device or from the external device.

A chemical solution cleaning planning method for a water treatment facility in accordance with the present invention has a first feature, as described in claim 14, that the method includes: an operation information transmission step of transmitting operation information and cleaning chemical solution stock information from a management terminal to a management device via a communication medium, the operation information being related to a plurality of water treatment systems each including a membrane separation device installed therein, the management terminal being configured to manage the operation information; a transmembrane pressure difference prediction step, performed by a transmembrane pressure difference prediction unit provided in the management device, of predicting a general trend in a transmembrane pressure difference in each of the plurality of water treatment systems based on the operation information; a chemical solution cleaning planning step, performed by a chemical solution cleaning planning unit provided in the management device, of devising such a chemical solution cleaning plan that chemical solution cleaning is performed before a period when a value of the transmembrane pressure difference or a rate of change thereof predicted in each of the plurality of water treatment systems in the transmembrane pressure difference prediction step reaches a specified value; an operating conditions adjustment information generation step of generating operating conditions adjustment information based on which a specified-value reaching period of the transmembrane pressure difference in each of the plurality of water treatment systems is adjusted to be earlier or later than predicted in such a manner that there is no overlap between the specified-value reaching periods of the transmembrane pressure differences predicted in the plurality of water treatment systems in the transmembrane pressure difference prediction step; and an operating conditions adjustment information transmission step of transmitting the operating conditions adjustment information generated in the operating conditions adjustment information generation step to the management terminal, wherein the chemical solution cleaning planning step devises the chemical solution cleaning plan by taking the operating conditions adjustment information generated in the operating conditions adjustment information generation step into account.

Another chemical solution cleaning planning method for a water treatment facility in accordance with the present invention has a second feature that the method includes: an operation information collecting step of collecting, in a management device, operation information and cleaning chemical solution stock information related to a plurality of water treatment systems each including a membrane separation device installed therein; a transmembrane pressure difference prediction step, performed by a transmembrane pressure difference prediction unit provided in the management device, of predicting a general trend in a transmembrane pressure difference in each of the plurality of water treatment systems based on the operation information; a chemical solution cleaning planning step, performed by a chemical solution cleaning planning unit provided in the management device, of devising such a chemical solution cleaning plan that chemical solution cleaning is performed before a period when a value of the transmembrane pressure difference or a rate of change thereof predicted in each of the plurality of water treatment systems in the transmembrane pressure difference prediction step reaches a specified value; and an operating conditions adjustment information generation step of generating operating conditions adjustment information based on which a specified-value reaching period of the transmembrane pressure difference in each of the plurality of water treatment systems is adjusted to be earlier or later than predicted in such a manner that there is no overlap between the specified-value reaching periods of the transmembrane pressure differences predicted in the plurality of water treatment systems in the transmembrane pressure difference prediction step, wherein the chemical solution cleaning planning step devises the chemical solution cleaning plan by taking the operating conditions adjustment information generated in the operating conditions adjustment information generation step into account.

Advantageous Effects of Invention

The present invention, as described above, makes it possible to provide a management device for a water treatment facility, a cleaning chemical solution order placement system for a water treatment facility, a chemical solution order placement method for a water treatment facility, and a chemical solution cleaning planning method for a water treatment facility, the device, system, and methods being capable of determining a suitable cleaning period even in non-steady situations and preventing an excess stock of the cleaning chemical solution.

BEST MODE FOR CARRYING OUT THE INVENTION

The following will describe a management device for a water treatment facility, a cleaning chemical solution order placement system for a water treatment facility, a chemical solution order placement method for a water treatment facility, and a chemical solution cleaning planning method for a water treatment facility, all in accordance with the present invention.

[Configuration of Cleaning Chemical Solution Order Placement System for Water Treatment Facilities]

Figure 1:
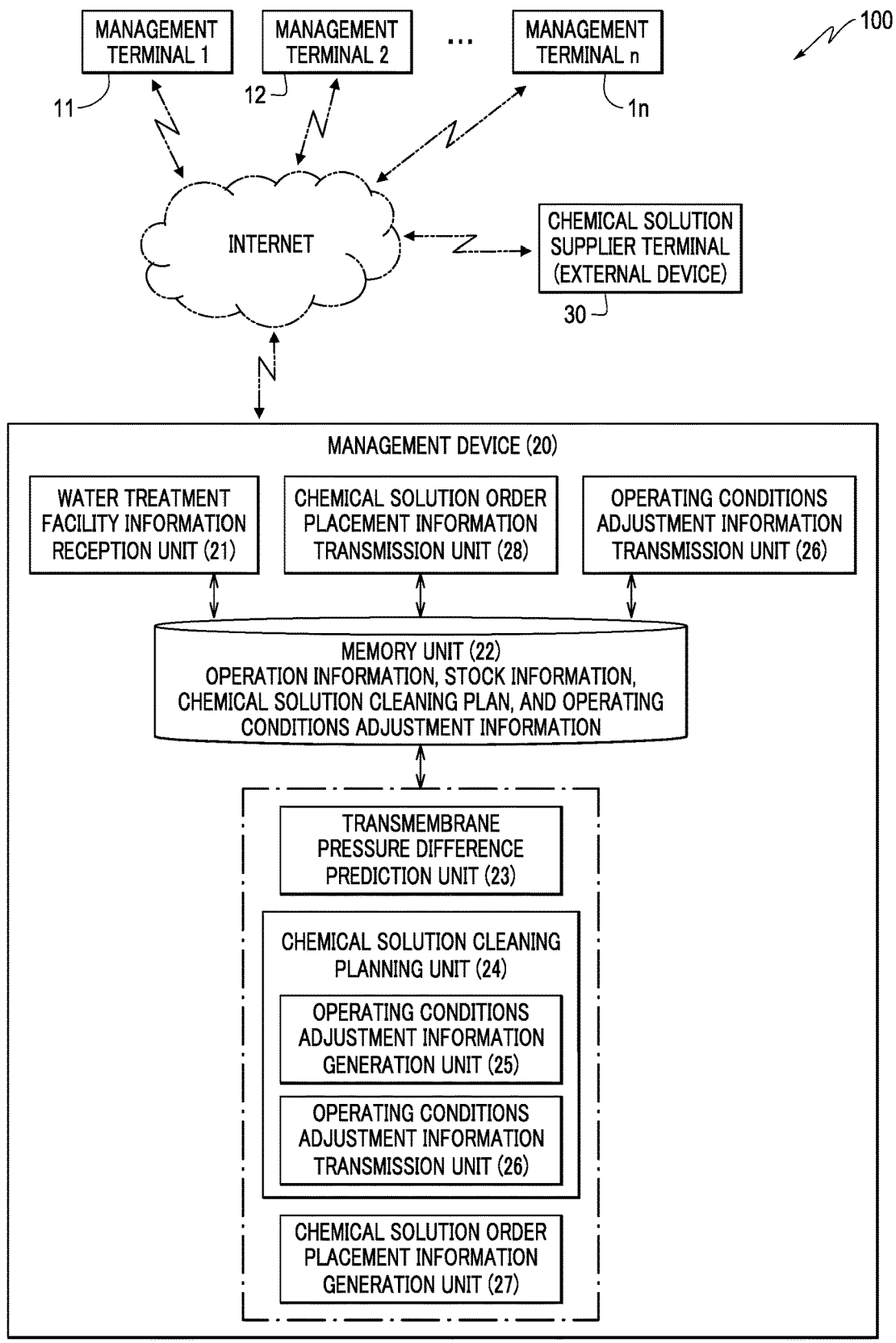
FIG. 1 is a diagram of a configuration of a cleaning chemical solution order placement system for water treatment facilities in accordance with the present invention.

Referring to FIG. 1, a cleaning chemical solution order placement system 100 for water treatment facilities where membrane separation devices are used includes: a management device 20 provided by a server computer managing a plurality of water treatment facilities in a centralized manner; management terminals 1 (11, 12, . . . , and 1n) provided by terminal computers installed in the water treatment facilities; and a chemical solution supplier terminal 30 provided likewise by a terminal computer. The management device 20, the management terminals 1, and the supplier terminal 30 are all connected in a communicable manner over the Internet.

There is provided a management terminal 1 in each water treatment facility. The management terminal 1 is configured to manage the operation information related to the water treatment system, which includes a membrane separation device installed therein, and to transmit the operation information and cleaning chemical solution stock information to the management device 20. The chemical solution supplier terminal 30 is configured to arrange a supply of a chemical solution to a proper water treatment facility on the basis of the chemical solution order placement information transmitted from the management device 20. The water treatment system is a chain of water treatment equipment, including a membrane separation device, that provides treated water from raw water through biological processes. Each water treatment facility is typically provided with a plurality of water treatment systems, the operation information related to all of which is managed by a single management terminal 1.

Specifically, the management terminal 1 includes an input interface for receiving incoming detected values from sensors installed in the water treatment systems to monitor operation parameters such as a transmembrane pressure difference TMP (transmembrane pressure), a membrane permeation flux Flux, an amount of extracted excess sludge, an amount of circulated sludge, and an amount of aeration or for receiving incoming adjusted parameters from workers instead of sensors, in order to manage the operation information related to the water treatment systems where the membrane separation devices are installed.

The parameters inputted via the input interface are stored in a memory in the management terminal 1 as the operation information. The operation information and stock information stored in the memory are outputted to the management device 20 over the Internet. The stock information is information on the chemical solution in stock in a cleaning chemical solution storehouse in each water treatment facility and refers to the type and amount of the cleaning chemical solution in stock that are inputted by a worker via the input interface.

The management terminal 1 includes a display unit for outputting (displaying) operation parameters for chemical solution cleaning, such as a membrane permeation flux Flux, an amount of extracted excess sludge, an amount of circulated sludge, and an amount of aeration, contained in a chemical solution cleaning plan (which will be described later in detail) transmitted from the management device 20. The management terminal 1 is configured to allow a worker to control the operation of the water treatment systems by visually checking the operation parameters displayed on the display unit. The management terminal 1 may have a function of automatically controlling some of the operation parameters such as the membrane permeation flux Flux, the amount of extracted excess sludge, the amount of circulated sludge, and the amount of aeration.

The management device 20 includes functional blocks including a memory unit 22, a water treatment facility information reception unit 21, a transmembrane pressure difference prediction unit 23, a chemical solution cleaning planning unit 24, an operating conditions adjustment information transmission unit 26, a chemical solution order placement information generation unit 27, and a chemical solution order placement information transmission unit 28.

The functional blocks are provided by: hardware such as a CPU board, a communication board, and a memory board in a server computer; and an application program executed by a CPU on the CPU board and stored in a memory on the memory board for the placement of an order for the cleaning chemical solution. The functional blocks are embodied by the CPU executing the application program.

The water treatment facility information reception unit 21 is a functional block for receiving the operation information and cleaning chemical solution stock information transmitted over the Internet (communication medium) from the management terminals 1 managing the operation information related to the water treatment systems where the membrane separation devices are installed and for storing the received operation information and cleaning chemical solution stock information in the memory unit 22.

The transmembrane pressure difference prediction unit 23 is a functional block for predicting a general trend in the transmembrane pressure difference TMP in each water treatment system on the basis of the operation information stored in the memory unit 22.

The chemical solution cleaning planning unit 24 is a functional block for devising such a chemical solution cleaning plan that the membranes are cleaned with the chemical solution before a period when the value of the transmembrane pressure difference or the rate of change thereof predicted by the transmembrane pressure difference prediction unit 23 reaches a specified value.

The chemical solution order placement information generation unit 27 is a functional block for generating the chemical solution order placement information on the basis of the chemical solution cleaning plan and the cleaning chemical solution stock information stored in the memory unit 22. The chemical solution order placement information transmission unit 28 is a functional block for transmitting the chemical solution order placement information generated by the chemical solution order placement information generation unit 27 to the chemical solution supplier terminal 30.

The supplier terminal 30, upon receiving the chemical solution order placement information transmitted from the chemical solution order placement information transmission unit 28, allocates a necessary amount of a necessary chemical solution and processes a dispatch thereof in such a manner that the chemical solution can arrive at the water treatment facility (delivery point) in time for a delivery date and time specified in the chemical solution order placement information.

The chemical solution order placement information is transmitted from the chemical solution order placement information transmission unit 28 to the supplier terminal 30 in the present embodiment. The chemical solution order placement information may alternatively be transmitted from the chemical solution order placement information transmission unit 28 to an external device other than the supplier terminal 30.

The external device may be, for example, the management terminal 1, a management service provider terminal for a water treatment facility, or a chemical solution supplier terminal. If the chemical solution order placement information is transmitted to the management terminal 1, a manager of the water treatment facility where the management terminal 1 is installed can place an order with a chemical solution supplier on the basis of the chemical solution order placement information. If the chemical solution order placement information is transmitted to a management service provider terminal managed by a management service provider to whom the management of the water treatment facility is contracted out, a staff member of the management service provider can place an order with a chemical solution supplier on the basis of the chemical solution order placement information.

[Description of Prediction of Transmembrane Pressure Difference and Devising of Chemical Solution Cleaning Plan]

Figure 2A:
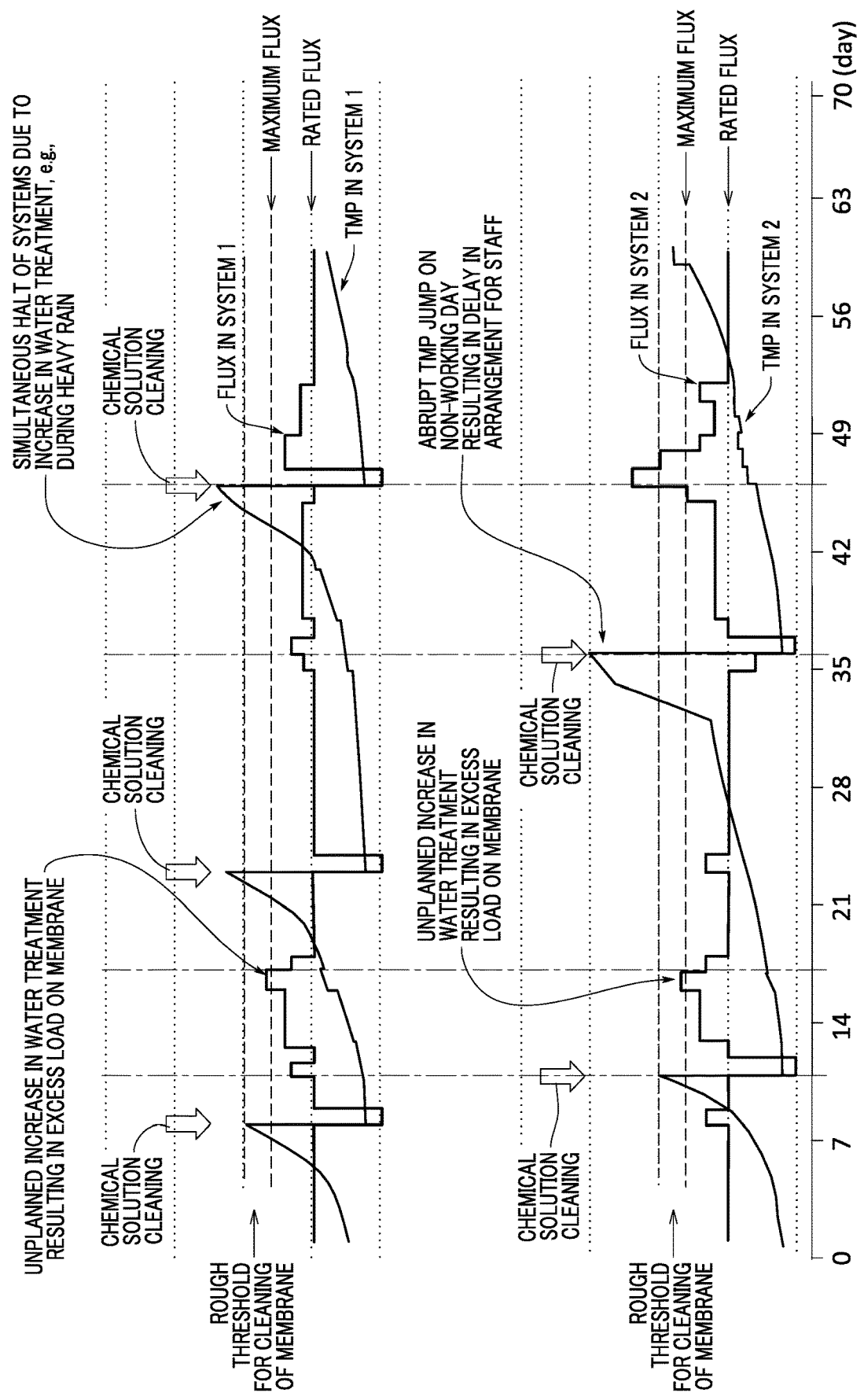
FIGS. 2A-2C are a diagram depicting chemical solution cleaning periods of membrane separation devices and general trends in chemical solution stocks in a conventional water treatment facility.
Figure 2B:
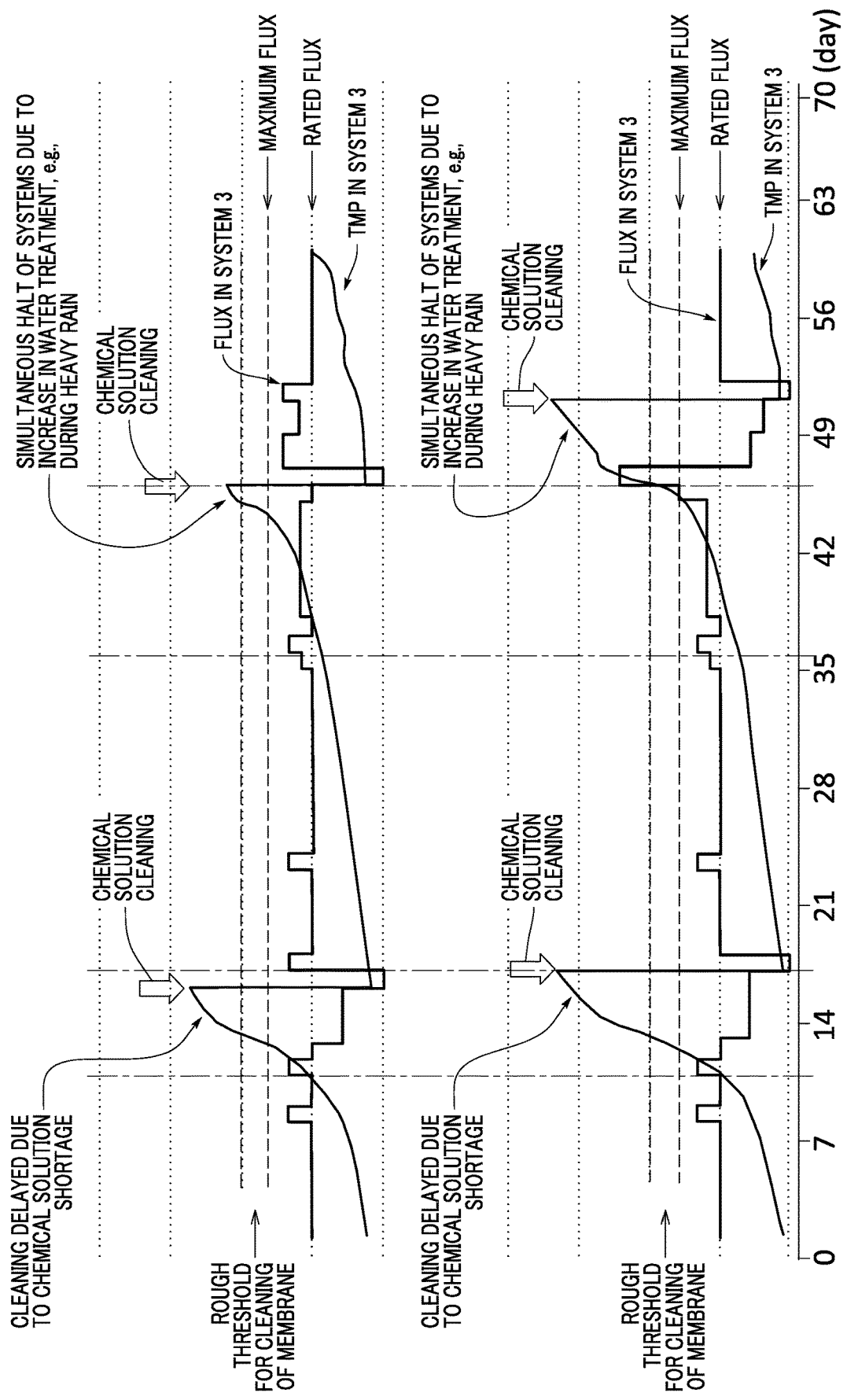
Figure 2C:
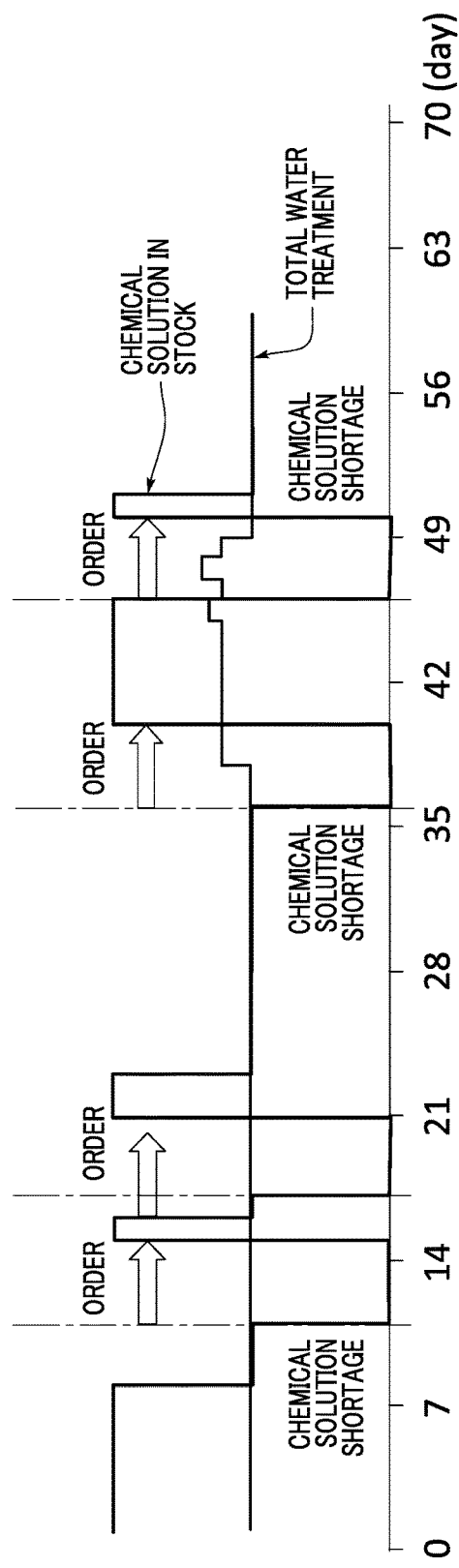

FIG. 2 shows: conventional control of the membrane permeation flux Flux; resultant general trends in the transmembrane pressure difference TMP (transmembrane pressure); chemical solution cleaning periods of membrane separation devices in response to an excessive rise in the transmembrane pressure difference TMP, which may be referred to as a TMP jump; and general trends in the chemical solution stocks, by taking as an example of a water treatment facility, an MBR (membrane bioreactor) plant equipped with four water treatment systems each including a membrane separation device. The horizontal axis represents passage of time.

The facility includes a storehouse capable of housing an amount of the membrane cleaning chemical solution that is required to clean two water treatment systems. It takes four days after the placement of an order to have the chemical solution delivered to the facility. The membrane permeation flux Flux has a rating 0.5 m/d and a maximum value (tolerance) of 0.8 m/d. A 10•kPa TMP is used as a rough threshold for cleaning of the membrane. If the water treatment system is run with a Flux greater than or equal to the maximum value or with a TMP in excess of the rough threshold for cleaning, the membrane can quickly reach the end of its lifetime.

The membrane in a first system (hereinafter, may be simply referred to as "system 1") is cleaned with the chemical solution in a period when the TMP exceeds the rough threshold for cleaning. Thereafter, the membrane in system 2 is cleaned with the chemical solution when the TMP exceeds the rough threshold for cleaning for the first time. These two cleanings use up all the chemical solution stocks. An order is then placed for the chemical solution, and the ordered chemical solution is delivered four days later. If the TMP exceeds the rough threshold for cleaning in system 3 or 4 during the four-day period, the membrane cannot be cleaned with the chemical solution, and the TMP may increase excessively. The Flux falls below the rated value in systems 3 and 4 during the period. Accordingly, in systems 1 and 2, the Flux is temporarily set to or above the maximum value to compensate for the drop in performance in systems 3 and 4.

When the chemical solution is delivered, the membrane is cleaned with the chemical solution at different times in systems 3 and 4. An order for the chemical solution is then placed in preparation for next cleaning. Thereafter, when the TMP exceeds the rough threshold for cleaning in system 2, the TMP increases excessively because it happens to be a non-working day when there are no workers in the facility. An increased amount of water needs to be treated in the wake of heavy rain, and the TMP may exceed the rough threshold for cleaning in a plurality of systems simultaneously. In such a case, the chemical solution can run out stock, which may bring water treatment to a complete halt.

In other words, since no replenishment order is placed for the chemical solution until the chemical solution completely runs out of stock, if there occurs a TMP jump in a plurality of systems in the same period, there occurs a shortage of the chemical solution, and the membranes in some of the systems are forced to operate under an excess load. Such operation can severely affect the lifetime of the membranes.

Figure 3A:
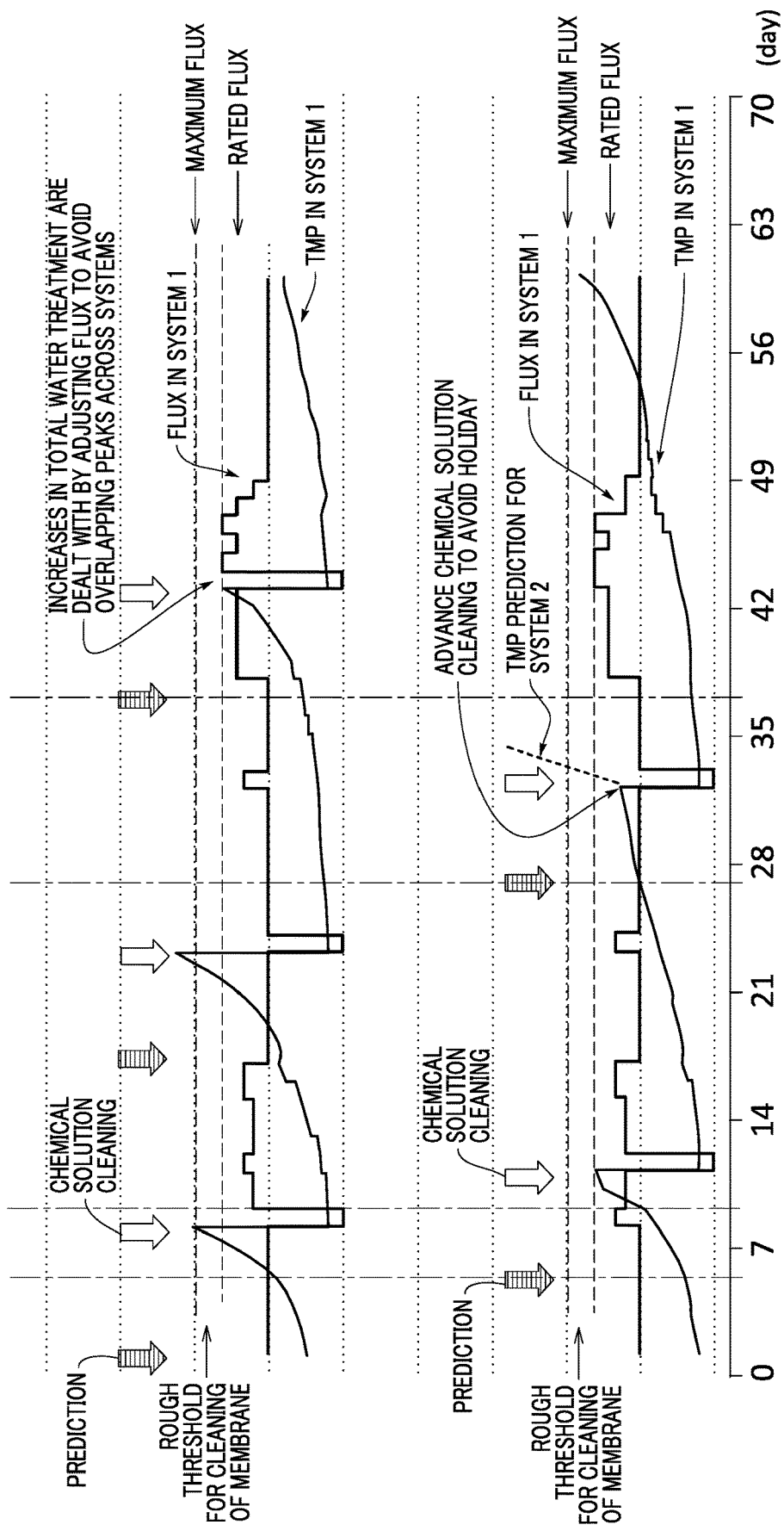
FIGS. 3A-3C are a diagram depicting chemical solution cleaning periods of membrane separation devices and general trends in chemical solution stocks in a water treatment facility to which a cleaning chemical solution order placement system in accordance with the present invention is applied.
Figure 3B:
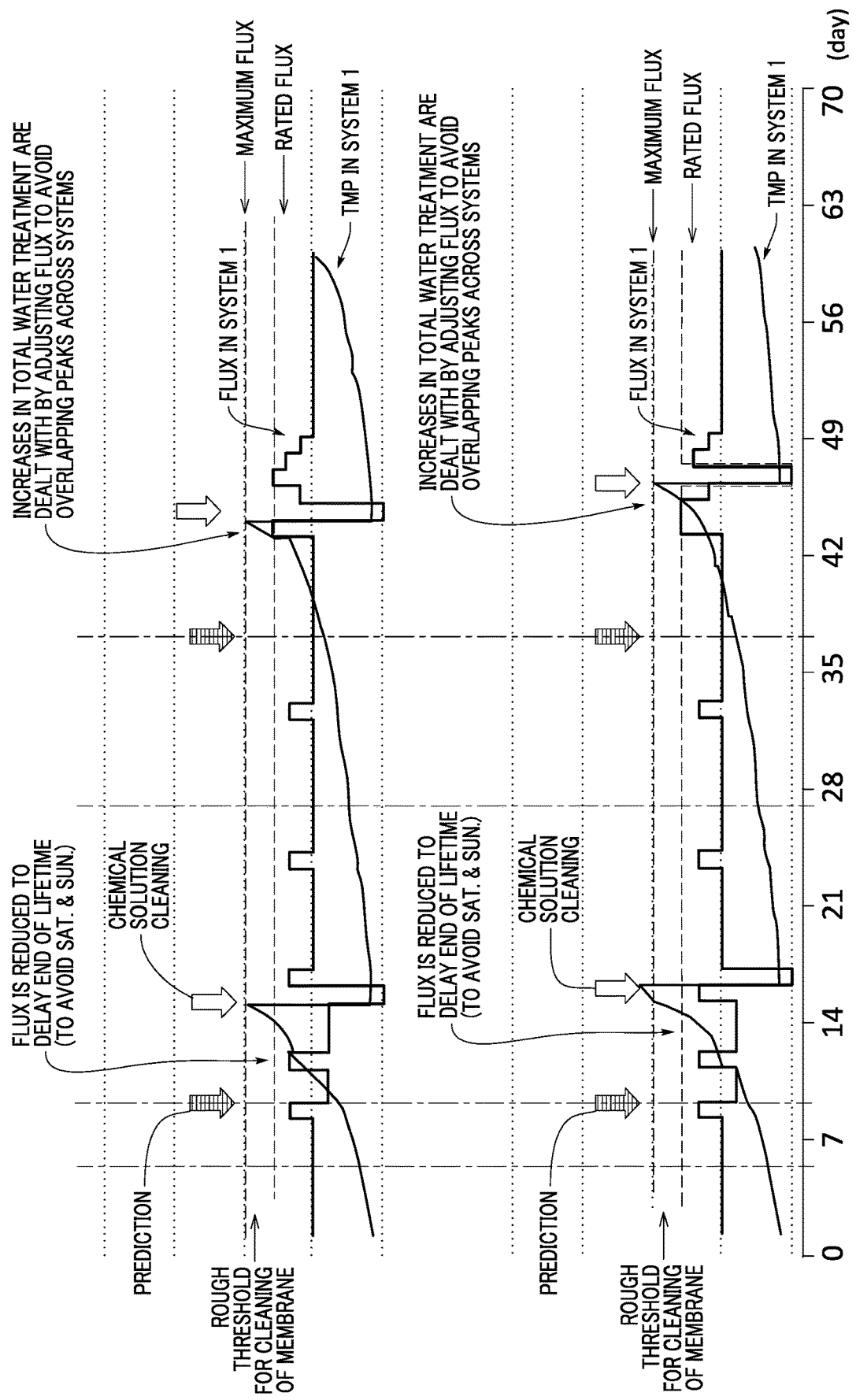
Figure 3C:
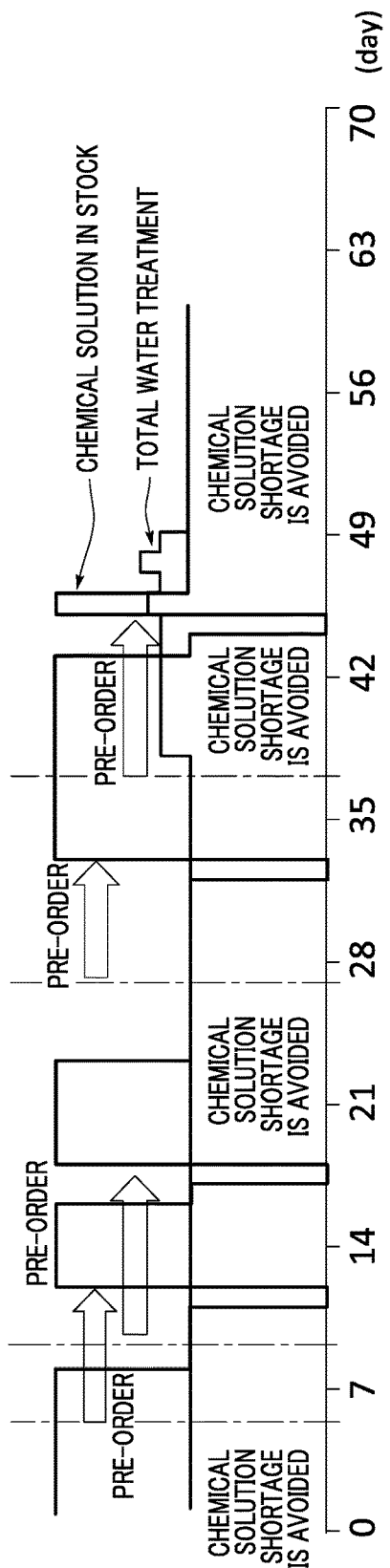

FIG. 3 shows chemical solution cleaning periods of membrane separation devices and general trends in chemical solution stocks in a case where the present invention is applied, in other words, in a case where the transmembrane pressure difference prediction unit 23 described above predicts when a TMP jump will occur (a "TMP jump occurring period"), and the chemical solution cleaning planning unit 24 adjusts the chemical solution cleaning periods of the systems so that the systems can be run properly without keeping any excess stock of the cleaning chemical solution.

The transmembrane pressure difference prediction unit 23 predicts a TMP jump occurring period in system 1 and then predicts a TMP jump occurring period in system 2. In response to these predictions, the chemical solution cleaning planning unit 24 specifies a chemical solution cleaning period for system 1 such that the chemical solution cleaning period falls in the TMP jump occurring period, and places a pre-order for the chemical solution in accordance with the consumption of the chemical solution in system 1 during the chemical solution cleaning period.

Thereafter, the transmembrane pressure difference prediction unit 23 predicts TMP jump occurring periods in systems 3 and 4. If the chemical solution is predicted to run out of stock during these periods, the chemical solution cleaning planning unit 24 specifies conditions for adjusting operating conditions and a chemical solution cleaning period for system 2 such that the chemical solution cleaning period comes before the predicted TMP jump occurring period. Systems 3 and 4 are controlled to operate with a Flux lower than the rated value so as to delay the TMP jump occurring period.

If the transmembrane pressure difference prediction unit 23 predicts that the TMP jump occurring period can fall on a non-working day in system 2, either of the following is performed: the chemical solution cleaning period is specified to come earlier on the basis of the conditions for adjusting operating conditions specified by the chemical solution cleaning planning unit 24; or system 2 is controlled to operate with a Flux lower than the rated value so that there occurs a TMP jump after the non-working day.

If the transmembrane pressure difference prediction unit 23 predicts that a TMP jump can occur in systems 1, 3, and 4 in overlapping periods, the chemical solution cleaning planning unit 24 adjusts (increases or decreases) the Flux in each system in such a manner that the TMP jump occurring periods do not overlap and places an order for the chemical solution in preparation for the specified chemical solution cleaning periods. The chemical solution cleaning planning unit 24 adjusts (increases or decreases) the Flux in each system in such a manner that the total amount of permeate through the membrane in each system is equal to the planned amount. In this example, the Flux may be increased beyond the rated value in system 2 where the membrane is cleaned with the chemical solution before the TMP jump occurring period.

The capability of the transmembrane pressure difference prediction unit 23 of predicting a TMP jump occurring period enables a pre-order to be placed for the chemical solution, thereby preventing the chemical solution from running out. The control of the Flux in each system on the basis of the conditions for adjusting operating conditions specified by the chemical solution cleaning planning unit 24 makes it possible to prevent a TMP jump from occurring on non-working days when there is not enough staff and to prevent a TMP jump from occurring in a plurality of systems in the same period.

[Configuration of Management Device]

A detailed description will be given of a configuration of the management device 20 for realizing the chemical solution cleaning periods of the membrane separation devices and the general trends in chemical solution stocks shown in FIG. 3.

The transmembrane pressure difference prediction unit 23 predicts, by computing, a general trend in the transmembrane pressure difference TMP in each water treatment system on the basis of the operation information related to the water treatment system. For instance, the transmembrane pressure difference prediction unit 23 predicts, by computing, the transmembrane pressure difference TMP for the coming three to seven days at a frequency of four to five times a day. A predictive computing algorithm such as neural network computing or statistical computing may be suitably used.

For instance, a prediction can be made by a general multivariable analysis technique by using the transmembrane pressure difference TMP as an objective variable and using, as explanatory variables, either any of the transmembrane pressure difference TMP, Flux, water temperature, amount of aeration, turbidity, amount of treated water, pH, DO (dissolved oxygen), ORP (oxidation-reduction potential), MLSS (mixed liquor suspended solids), and operating time (time elapsed since the last chemical solution cleaning) that can be obtained by monitoring a membrane separation tank and reaction tanks (e.g., an aerobic tank, an anaerobic tank, and a raw water tank) located upstream or downstream from the membrane separation tank or a combination of these factors.

A publicly known predictive computing technique may be used in a suitable manner to predict, by computing, a general trend in the transmembrane pressure difference TMP. In other words, the operation information may include either any of the transmembrane pressure difference, flux, water temperature, amount of aeration, turbidity, amount of treated water, pH, DO, ORP, MLSS, TOC, COD, BOD, and concentration of $NH_3$ in the water treatment systems or a combination of these factors.

The chemical solution cleaning planning unit 24 includes: an operating conditions adjustment information generation unit 25 for generating operating conditions adjustment information based on which a period when the transmembrane pressure difference is predicted by the transmembrane pressure difference prediction unit 23 to reach a specified-value ("specified-value reaching period of the transmembrane pressure difference") is adjusted to be earlier or later than predicted; and the operating conditions adjustment information transmission unit 26 for transmitting the operating conditions adjustment information to the management terminals. The chemical solution cleaning planning unit 24 is configured to devise a chemical solution cleaning plan by taking the operating conditions adjustment information into account.

The chemical solution order placement information generation unit 27 generates such chemical solution order placement information that a necessary amount of a necessary chemical solution can be procured in time for a planned cleaning period, by taking into account the devised chemical solution cleaning plan, the chemical solution stock information, and the time taken to have the chemical solution delivered. The chemical solution order placement information generation unit 27 then stores the generated chemical solution order placement information in the memory unit 22.

The operating conditions adjustment information generated by the operating conditions adjustment information generation unit 25 is transmitted to the management terminals 1, so that the operating conditions for the water treatment systems in the water treatment facility managed by each management terminal 1 are adjusted. Consequently, the specified-value reaching period of the transmembrane pressure difference predicted by the transmembrane pressure difference prediction unit 23 is adjusted to be earlier or later than predicted.

The chemical solution cleaning planning unit 24 then devises a chemical solution cleaning plan by taking the operating conditions adjustment information into account. In other words, the chemical solution cleaning planning unit 24 devises a chemical solution cleaning plan on the basis of a general trend in the transmembrane pressure difference TMP predicted on the basis of new operation information updated as a result of the operating conditions for each water treatment system being altered on the basis of the operating conditions adjustment information.

For instance, if the operating conditions are adjusted in such a manner that the chemical solution cleaning period does not fall on a non-working day when there are no staff members, situations can be prevented where the water treatment system stops running due to an abrupt rise in the transmembrane pressure difference. If the cleaning chemical solution is predicted to run out of stock, the operating conditions are adjusted in such a manner that the chemical solution cleaning period is delayed until a period when there is a cleaning chemical solution available. This adjustment of the operating conditions leads to a predicted value of the transmembrane pressure difference TMP based on which a chemical solution cleaning plan is devised.

Referring to FIG. 3, the transmembrane pressure difference prediction unit 23 predicts a general trend in the transmembrane pressure difference for each water treatment system in the water treatment facilities each including a plurality of water treatment systems. On the basis of the general trend in the transmembrane pressure difference predicted for each water treatment system by the transmembrane pressure difference prediction unit 23, the operating conditions adjustment information generation unit 25 generates the operating conditions adjustment information for each water treatment system in such a manner that the specified-value reaching periods of the transmembrane pressure differences in the water treatment systems do not overlap. The chemical solution cleaning planning unit 24 devises such a chemical solution cleaning plan that chemical solution cleaning is performed before the specified-value reaching period of the transmembrane pressure difference predicted for each water treatment system. Therefore, there is no need to have a large amount of chemical solution in stock in a large storage space. The amount of the chemical solution in stock can be hence reduced to a minimum.

The operating conditions adjustment information provides target values for the operating conditions used to alter and adjust the predicted value of the transmembrane pressure difference TMP given by the transmembrane pressure difference prediction unit 23. The operating conditions adjustment information includes, for example, any of the flux, amount of extracted excess sludge, amount of circulated sludge, amount of aeration, and chemical solution cleaning period. For instance, by increasing or decreasing the flux in the membrane separation device or by increasing or decreasing the amount of aeration of the membrane separation device, the amount of fouling material sticking to the membrane surface is adjusted so that the changes in the transmembrane pressure difference can be adjusted to either speed up or slow down. Furthermore, by increasing or decreasing the amount of extracted excess sludge, the BOD load can be rendered adjustable so that, for example, the amount of existent fouling material can be adjusted.

The chemical solution cleaning planning unit 24 is configured to decide on the type of the chemical solution used in chemical solution cleaning from an increasing trend in the transmembrane pressure difference predicted by the transmembrane pressure difference prediction unit 23 and/or an increasing trend in the transmembrane pressure difference contained in the operation information.

In typical cases where fouling progresses due to organic materials (microorganic metabolic components) as judged from an increasing trend in the transmembrane pressure difference, sodium hypochlorite, which is a cleaning chemical solution that works well with organic fouling materials, may be selected as a cleaning chemical solution.

If an unusual behavior is detected, the type of the chemical solution used in cleaning can be changed to address the problem in a suitable manner. For instance, if it is determined from past trends that the membrane pressure difference has risen due to fouling caused by an inorganic component, a cleaning chemical solution, such as hydrochloric acid, oxalic acid, or citric acid, that works well with an inorganic fouling material may be selected.

If the membrane pressure difference rise is due to inorganically caused fouling, there are some observable trends, such as the initial pressure remaining high and the membrane pressure difference rising rapidly after cleaning using sodium hypochlorite, in comparison with typical cases.

Accordingly, the chemical solution cleaning planning unit 24 is configured to determine properly as to, for example, which of a cleaning chemical solution, such as hydrochloric acid, oxalic acid, or citric acid, that works well with an inorganic fouling material or a cleaning chemical solution, such as sodium hypochlorite, that works well with an organic fouling material is preferable as a chemical solution for use in chemical solution cleaning, from an increasing trend in the transmembrane pressure differences predicted by the transmembrane pressure difference prediction unit 23 and/or from an increasing trend in the transmembrane pressure differences contained in the operation information.

Figure 4:
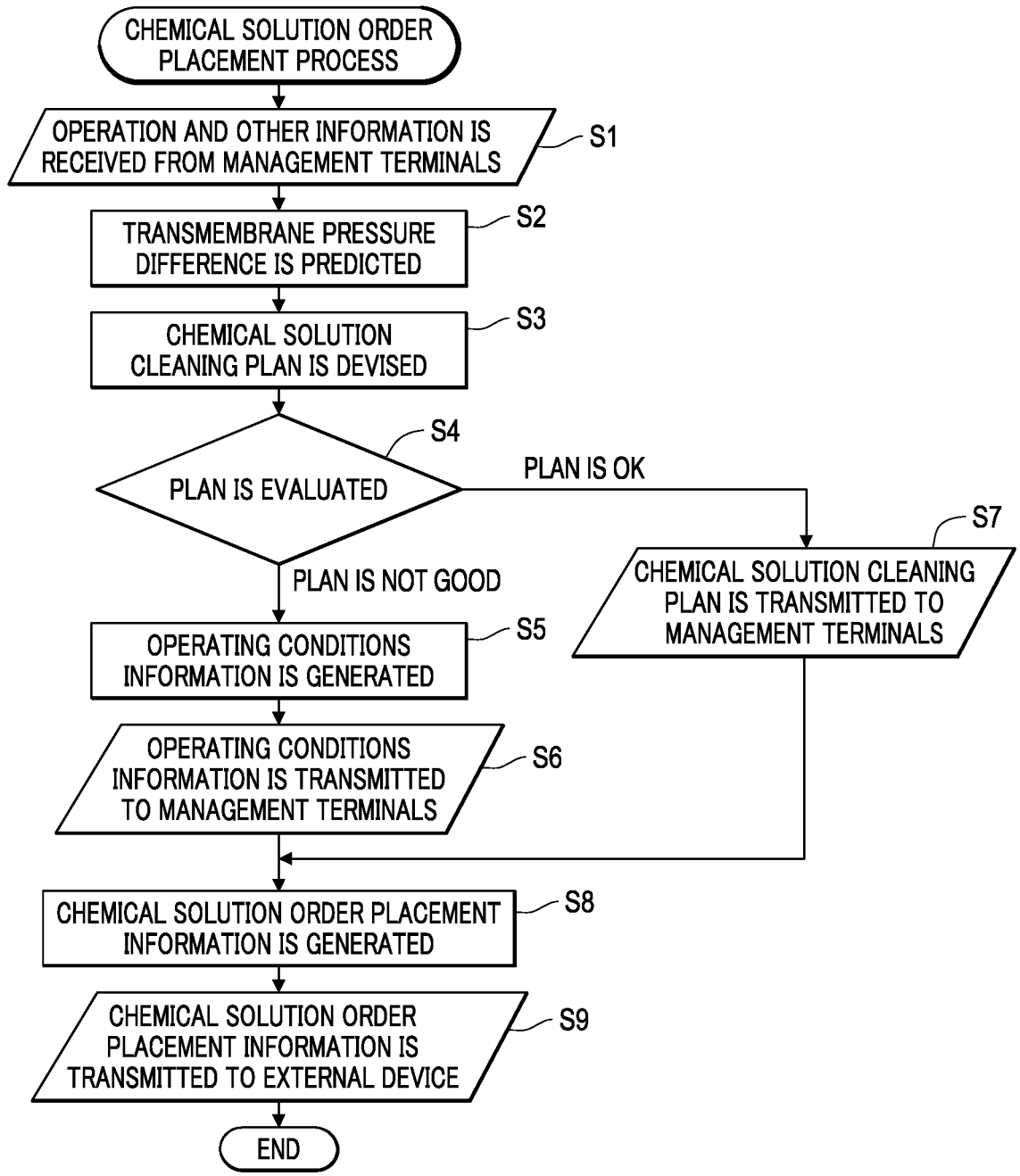
FIG. 4 is a flow chart representing a process performed by a management device for water treatment facilities.

The above-described cleaning chemical solution order placement system implements a chemical solution order placement method for a water treatment facility in accordance with the present invention. More specifically, as shown in FIG. 4, the cleaning chemical solution order placement system performs: an operation information transmission step (S1) of transmitting operation information and cleaning chemical solution stock information from a management terminal to a management device via a communication medium, the operation information being related to a water treatment system including a membrane separation device installed therein, the management terminal managing the operation information; a transmembrane pressure difference prediction step (S2), performed by a transmembrane pressure difference prediction unit provided in the management device, of predicting a general trend in a transmembrane pressure difference in the water treatment system on the basis of the operation information; and a chemical solution cleaning planning step (S3), performed by a chemical solution cleaning planning unit provided in the management device, of devising such a chemical solution cleaning plan that chemical solution cleaning is performed before a period when a value of the transmembrane pressure difference or a rate of change thereof predicted in the transmembrane pressure difference prediction step reaches a specified value.

Next, the cleaning chemical solution order placement system performs: a step (S7) of transmitting the devised chemical solution cleaning plan to the management terminal; and a chemical solution order placement information generation step (S8), performed by the chemical solution order placement information generation unit provided in the management device, of generating chemical solution order placement information on the basis of the chemical solution cleaning plan and the cleaning chemical solution stock information.

Furthermore, the cleaning chemical solution order placement system performs: a chemical solution order placement information transmission step (S9), performed by the chemical solution order placement information transmission unit provided in the management device, of transmitting the chemical solution order placement information generated in the chemical solution order placement information generation step to an external device including the management terminal; and a cleaning chemical solution dispatch processing step (not shown), performed by a chemical solution supplier terminal, of processing a dispatch of the cleaning chemical solution to the water treatment facility including the water treatment system on the basis of the chemical solution order placement information received from the management device or from the management terminal.

The plan devised in the chemical solution cleaning planning step (S3) is evaluated in terms of its appropriateness (S4). If the plan is appropriate, a chemical solution order placement information generation step (S8) is performed. If the plan is inappropriate, an operating conditions information generation step is performed (S5). Criteria specified and used in the appropriateness evaluation may be, for example, whether or not a suitable amount of the chemical solution is procured in time for the chemical solution cleaning period specified for each system, whether or not the specified chemical solution cleaning period falls on a non-working day including Saturdays and Sundays, and whether or not the total Flux from each system fluctuates greatly from a prescribed amount.

The performing of the transmembrane pressure difference prediction step enables the prediction of a transmembrane pressure difference. The predicted transmembrane pressure difference can be used in devising a chemical cleaning plan (arrangement for sufficient staff and procurement of chemicals) and also enables such an adjustment of the operating conditions as to delay the period when the transmembrane pressure difference can rise. In situations where the transmembrane pressure difference is allowed to safely rise above the rated value, efficient membrane filtration management can be performed using a Flux being greater than or equal to the rated value from the viewpoint of, for example, allowing for energy saving and ensuring the treatment of a sufficient amount of water.

Specifically, if a period can be predicted when the membrane pressure difference can rise, and an order is placed for the chemical in time for a chemical solution cleaning period, the facility can operate on a minimum stock. In addition, if the Flux is adjusted across a plurality of systems, the plurality of systems can be prevented from coming to a simultaneous complete halt.

Lowering of the Flux and adjustment of the amount of extracted sludge (MLSS adjustment) can be suitably used as an operation management technique of suppressing rises in the transmembrane pressure difference. It is only required to reduce the extraction amount and maintain the MLSS at a high level when there is a high load per unit amount of sludge or when sludge activity decreases at low water temperature. Conversely, when the sludge is too thick, it is only required to increase the extraction amount and shorten the SRT.

The following will describe other embodiments.

The embodiments have so far described a configuration where a management device provided by a server computer collects operation information and chemical solution stock information from management terminals installed in a plurality of water treatment facilities to manage the water treatment facilities in a centralized manner. Alternatively, the management terminal in each water treatment facility may be configured to serve as a management device for managing the water treatment facilities.

In other words, an alternative embodiment may provide a management device for water treatment facilities each including a management terminal that manages operation information related to a water treatment system including a membrane separation device installed therein, the management device including: a water treatment facility information collecting unit configured to collect the operation information and cleaning chemical solution stock information related to the water treatment system including the membrane separation device installed therein; a transmembrane pressure difference prediction unit configured to predict a general trend in a transmembrane pressure difference in the water treatment system based on the operation information; a chemical solution cleaning planning unit configured to devise such a chemical solution cleaning plan that chemical solution cleaning is performed before a period when a value of the transmembrane pressure difference or a rate of change thereof predicted by the transmembrane pressure difference prediction unit reaches a specified value; and a chemical solution order placement information generation unit configured to generate chemical solution order placement information based on the chemical solution cleaning plan and the cleaning chemical solution stock information.

A chemical solution order placement method to be implemented in this alternative case includes: an operation information collecting step, performed by the management terminals, of collecting, in a management device, operation information and cleaning chemical solution stock information related to a water treatment system including a membrane separation device installed therein; a transmembrane pressure difference prediction step, performed by a transmembrane pressure difference prediction unit provided in the management device, of predicting a general trend in a transmembrane pressure difference in the water treatment system based on the operation information; a chemical solution cleaning planning step, performed by a chemical solution cleaning planning unit provided in the management device, of devising such a chemical solution cleaning plan that chemical solution cleaning is performed before a period when a value of the transmembrane pressure difference or a rate of change thereof predicted in the transmembrane pressure difference prediction step reaches a specified value; a chemical solution order placement information generation step, performed by a chemical solution order placement information generation unit provided in the management device, of generating chemical solution order placement information based on the chemical solution cleaning plan and the cleaning chemical solution stock information; a chemical solution order placement information transmission step, performed by a chemical solution order placement information transmission unit provided in the management device, of transmitting the chemical solution order placement information generated in the chemical solution order placement information generation step to an external device; and a cleaning chemical solution dispatch processing step, performed by a chemical solution supplier terminal, of processing a dispatch of a cleaning chemical solution to the water treatment facility including the water treatment system based on the chemical solution order placement information received from the management terminals.

The embodiments have so far described the water treatment facility including a membrane separation device as being an MBR plant. The present invention is applicable, however, to water purification plants, seawater desalination plants, and other like water treatment facilities equipped with a membrane separation device.

The embodiments described above are mere examples of the present invention. The specific configuration of each functional block may be varied in a suitable manner provided that those variations can achieve the functions and effects of the present invention.

REFERENCE SIGNS LIST

1 Management Terminal
20 Management Device
21 Water Treatment Facility Information Reception Unit
22 Memory Unit
23 Transmembrane Pressure Difference Prediction Unit
24 Chemical Solution Cleaning Planning Unit
25 Operating Conditions Adjustment Information Generation Unit
26 Operating Conditions Adjustment Information Transmission Unit
27 Chemical Solution Order Placement Information Generation Unit
28 Chemical Solution Order Placement Information Transmission Unit
30 External Device (Chemical Solution Supplier Terminal)
100 Cleaning Chemical Solution Order Placement System

The invention claimed is:

1. A management device for a water treatment facility including a plurality of water treatment systems each using a membrane separation device, the management device comprising:
   a processor programmed to:
      receive operation information and cleaning chemical solution stock information transmitted from a management terminal via a communication medium, the operation information being related to each of the plurality of water treatment systems each including the membrane separation device installed therein, the management terminal being configured to manage the operation information;
      predict a general trend in a transmembrane pressure difference in each of the plurality of water treatment systems based on the operation information;
      devise a chemical solution cleaning plan such that chemical solution cleaning is performed before a period when a value of the transmembrane pressure difference or a rate of change thereof predicted in each of the plurality of water treatment systems by the processor reaches a specified value;
      generate operating conditions adjustment information based on which a specified-value reaching period of the transmembrane pressure difference in each of the plurality of water treatment systems is adjusted to be earlier or later than predicted in such a manner that there is no overlap between the specified-value reaching periods of the transmembrane pressure differences predicted in the plurality of water treatment systems by the processor; and
      transmit the operating conditions adjustment information to the management terminal, and cause the plurality of water treatment systems to operate based on the operating conditions adjustment information so that the transmembrane pressure difference in each of the plurality of water treatment systems is adjusted to be earlier or later than predicted in such a manner that there is no overlap between the specified-value reaching periods of the transmembrane pressure differences predicted in the plurality of water treatment systems,
   wherein the processor devises the chemical solution cleaning plan by taking the operating conditions adjustment information into account.

2. The management device for a water treatment facility according to claim 1, wherein:
   the processor is further programmed to:
      generate chemical solution order placement information based on the chemical solution cleaning plan and the cleaning chemical solution stock information; and
      transmit the chemical solution order placement information generated by the processor to an external device including the management terminal.

3. The management device for a water treatment facility according to claim 2, wherein the external device includes any of the management terminal, a management service provider terminal for the water treatment facility, and a chemical solution supplier terminal.

4. The management device for a water treatment facility according to claim 1, wherein the operating conditions adjustment information includes any of a flux, an amount of extracted excess sludge, an amount of circulated sludge, an amount of aeration, and a chemical solution cleaning period.

5. The management device for a water treatment facility according to claim 1, wherein the operation information includes any of the transmembrane pressure difference, a flux, water temperature, an amount of aeration, turbidity, an amount of treated water, pH, DO, an ORP, MLSS, TOC, COD, BOD, and a concentration of $NH_3$ in the plurality of water treatment systems or a combination thereof.

6. The management device for a water treatment facility according to claim 1, wherein the processor determines a type of a chemical solution for use in the chemical solution cleaning from an increasing trend in the transmembrane pressure differences predicted by the processor and/or from an increasing trend in the transmembrane pressure differences contained in the operation information.

7. A management device for a water treatment facility including a management terminal configured to manage operation information related to a plurality of water treatment systems each including a membrane separation device installed therein, the management device comprising:
a processor programmed to:
collect the operation information and cleaning chemical solution stock information related to each of the plurality of water treatment systems each including the membrane separation device installed therein;
predict a general trend in a transmembrane pressure difference in each of the plurality of water treatment systems based on the operation information;
devise a chemical solution cleaning plan such that chemical solution cleaning is performed before a period when a value of the transmembrane pressure difference or a rate of change thereof predicted in each of the plurality of water treatment systems by the processor reaches a specified value;
generate operating conditions adjustment information based on which a specified-value reaching period of the transmembrane pressure difference in each of the plurality of water treatment systems is adjusted to be earlier or later than predicted in such a manner that there is no overlap between the specified-value reaching periods of the transmembrane pressure differences predicted in the plurality of water treatment systems by the processor; and
transmit the operating conditions adjustment information to the management terminal, and cause the plurality of water treatment systems to operate based on the operating conditions adjustment information, so that the transmembrane pressure difference in each of the plurality of water treatment systems is adjusted to be earlier or later than predicted in such a manner that there is no overlap between the specified-value reaching periods of the transmembrane pressure differences predicted in the plurality of water treatment systems,
wherein the processor devises the chemical solution cleaning plan by taking the operating conditions adjustment information into account.

8. The management device for a water treatment facility according to claim 7, wherein the processor is further programmed to generate chemical solution order placement information based on the chemical solution cleaning plan and the cleaning chemical solution stock information.

9. The management device for a water treatment facility according to claim 7, wherein the operating conditions adjustment information includes any of a flux, an amount of extracted excess sludge, an amount of circulated sludge, an amount of aeration, and a chemical solution cleaning period.

10. The management device for a water treatment facility according to claim 7, wherein the operation information includes any of the transmembrane pressure difference, a flux, water temperature, an amount of aeration, turbidity, an amount of treated water, pH, DO, an ORP, MLSS, TOC, COD, BOD, and a concentration of $NH_3$ in the plurality of water treatment systems or a combination thereof.

11. The management device for a water treatment facility according to claim 7, wherein the processor determines a type of a chemical solution for use in the chemical solution cleaning from an increasing trend in the transmembrane pressure differences predicted by the processor and/or from an increasing trend in the transmembrane pressure differences contained in the operation information.

12. A cleaning chemical solution order placement system for a water treatment facility, the system comprising:
a management device for a water treatment facility including a plurality of water treatment systems each using a membrane separation device, the management device including:
a processor programmed to:
receive operation information and cleaning chemical solution stock information transmitted from a management terminal via a communication medium, the operation information being related to each of the plurality of water treatment systems each including the membrane separation device installed therein, the management terminal being configured to manage the operation information,
predict a general trend in a transmembrane pressure difference in each of the plurality of water treatment systems based on the operation information,
devise a chemical solution cleaning plan such that chemical solution cleaning is performed before a period when a value of the transmembrane pressure difference or a rate of change thereof predicted in each of the plurality of water treatment systems by the processor reaches a specified value by taking an operating conditions adjustment information,
generate the operating conditions adjustment information based on which a specified-value reaching period of the transmembrane pressure difference in each of the plurality of water treatment systems is adjusted to be earlier or later than predicted in such a manner that there is no overlap between the specified-value reaching periods of the transmembrane pressure differences predicted in the plurality of water treatment systems by the processor,
transmit the operating conditions adjustment information to the management terminal, and cause the plurality of water treatment systems to operate based on the operating conditions adjustment information, so that the transmembrane pressure difference in each of the plurality of water treatment systems is adjusted to be earlier or later than predicted in such a manner that there is no overlap between the specified-value reaching periods of the transmembrane pressure differences predicted in the plurality of water treatment systems,
generate chemical solution order placement information based on the chemical solution cleaning plan and the cleaning chemical solution stock information, and transmit the chemical solution order placement information generated by the processor to an external device including the management terminal;

the management terminal being configured to manage the operation information related to the plurality of water treatment systems each including the membrane separation device installed therein and to transmit the operation information and the cleaning chemical solution stock information to the management device; and a chemical solution supplier terminal configured to arrange a supply of a chemical solution based on the chemical solution order placement information transmitted from the management device, the management device, the management terminal, and the chemical solution supplier terminal being connected in a communicable manner.

13. A chemical solution order placement method for a water treatment facility, the method comprising:

an operation information transmission step of transmitting operation information and cleaning chemical solution stock information from a management terminal to a management device via a communication medium, the operation information being related to a plurality of water treatment systems each including a membrane separation device installed therein, the management terminal being configured to manage the operation information;

a transmembrane pressure difference prediction step, performed by a processor provided in the management device, of predicting a general trend in a transmembrane pressure difference in each of the plurality of water treatment systems based on the operation information;

a chemical solution cleaning planning step, performed by the processor provided in the management device, of devising such a chemical solution cleaning plan that chemical solution cleaning is performed before a period when a value of the transmembrane pressure difference or a rate of change thereof predicted in each of the plurality of water treatment systems in the transmembrane pressure difference prediction step reaches a specified value;

a chemical solution order placement information generation step, performed by the processor provided in the management device, of generating chemical solution order placement information based on the chemical solution cleaning plan and the cleaning chemical solution stock information;

an operating conditions adjustment information generation step of generating operating conditions adjustment information based on which a specified-value reaching period of the transmembrane pressure difference in each of the plurality of water treatment systems is adjusted to be earlier or later than predicted in such a manner that there is no overlap between the specified-value reaching periods of the transmembrane pressure differences predicted in the plurality of water treatment systems in the transmembrane pressure difference prediction step; and an operating conditions adjustment information transmission step of transmitting the operating conditions adjustment information generated in the operating conditions adjustment information generation step to the management terminal, and causing the plurality of water treatment systems to operate based on the operating conditions adjustment information, so that the transmembrane pressure difference in each of the plurality of water treatment systems is adjusted to be earlier or later than predicted in such a manner that there is no overlap between the specified-value reaching periods of the transmembrane pressure differences predicted in the plurality of water treatment systems, wherein the chemical solution cleaning planning step devises the chemical solution cleaning plan by taking the operating conditions adjustment information generated in the operating conditions adjustment information generation step into account.

14. The chemical solution order placement method for a water treatment facility according to claim 13, the method comprising:

a chemical solution order placement information transmission step, performed by the processor provided in the management device, of transmitting the chemical solution order placement information generated in the chemical solution order placement information generation step to an external device including the management terminal; and a cleaning chemical solution dispatch processing step, performed by a chemical solution supplier terminal, of processing a dispatch of a cleaning chemical solution to the water treatment facility including the plurality of water treatment systems based on the chemical solution order placement information received from the management device or from the management terminal.

15. A chemical solution order placement method for a water treatment facility, the method comprising:

an operation information collecting step of collecting, in a management device, operation information and cleaning chemical solution stock information related to a plurality of water treatment systems each including a membrane separation device installed therein;

a transmembrane pressure difference prediction step, performed by a processor provided in the management device, of predicting a general trend in a transmembrane pressure difference in each of the plurality of water treatment systems based on the operation information;

a chemical solution cleaning planning step, performed by the processor provided in the management device, of devising such a chemical solution cleaning plan that chemical solution cleaning is performed before a period when a value of the transmembrane pressure difference or a rate of change thereof predicted in each of the plurality of water treatment systems in the transmembrane pressure difference prediction step reaches a specified value;

a chemical solution order placement information generation step, performed by the processor provided in the management device, generating chemical solution order placement information based on the chemical solution cleaning plan and the cleaning chemical solution stock information; and an operating conditions adjustment information generation step of generating operating conditions adjustment information based on which a specified-value reaching period of the transmembrane pressure difference in each of the plurality of water treatment systems is adjusted to be earlier or later than predicted in such a manner that there is no overlap between the specified-value reaching periods of the transmembrane pressure differences predicted in the plurality of water treatment systems in the transmembrane pressure difference prediction step; and a control step of transmitting the operating conditions adjustment information to a management terminal, and causing the plurality of water treatment systems to operate based on the operating conditions adjustment information, so that the transmembrane pressure difference in each of the plurality of water treatment systems is adjusted to be earlier or later than predicted in such a manner that there is no overlap between the specified-value reaching periods of the transmembrane pressure differences predicted in the plurality of water treatment systems, wherein the chemical solution cleaning planning step devises the chemical solution cleaning plan by taking the operating conditions adjustment information generated in the operating conditions adjustment information generation step into account.

16. The chemical solution order placement method for a water treatment facility according to claim 15, the method comprising:

a chemical solution order placement information transmission step, performed by the processor provided in the management device, of transmitting the chemical solution order placement information generated in the chemical solution order placement information generation step to an external device including a chemical solution supplier terminal; and a cleaning chemical solution dispatch processing step, performed by the chemical solution supplier terminal, of processing a dispatch of a cleaning chemical solution to the water treatment facility including the plurality of water treatment systems based on the chemical solution order placement information received from the management device or from the external device.

17. A chemical solution cleaning planning method for a water treatment facility, the method comprising:

an operation information transmission step of transmitting operation information and cleaning chemical solution stock information from a management terminal to a management device via a communication medium, the operation information being related to a plurality of water treatment systems each including a membrane separation device installed therein, the management terminal being configured to manage the operation information;

a transmembrane pressure difference prediction step, performed by a processor provided in the management device, of predicting a general trend in a transmembrane pressure difference in each of the plurality of water treatment systems based on the operation information;

a chemical solution cleaning planning step, performed by the processor provided in the management device, of devising such a chemical solution cleaning plan that chemical solution cleaning is performed before a period when a value of the transmembrane pressure difference or a rate of change thereof predicted in each of the plurality of water treatment systems in the transmembrane pressure difference prediction step reaches a specified value;

an operating conditions adjustment information generation step of generating operating conditions adjustment information based on which a specified-value reaching period of the transmembrane pressure difference in each of the plurality of water treatment systems is adjusted to be earlier or later than predicted in such a manner that there is no overlap between the specified-value reaching periods of the transmembrane pressure differences predicted in the plurality of water treatment systems in the transmembrane pressure difference prediction step; and an operating conditions adjustment information transmission step of transmitting the operating conditions adjustment information generated in the operating conditions adjustment information generation step to the management terminal, and causing the plurality of water treatment systems to operate based on the operating conditions adjustment information, so that the transmembrane pressure difference in each of the plurality of water treatment systems is adjusted to be earlier or later than predicted in such a manner that there is no overlap between the specified-value reaching periods of the transmembrane pressure differences predicted in the plurality of water treatment systems, wherein the chemical solution cleaning planning step devises the chemical solution cleaning plan by taking the operating conditions adjustment information generated in the operating conditions adjustment information generation step into account.

18. A chemical solution cleaning planning method for a water treatment facility, the method comprising:

an operation information collecting step of collecting, in a management device, operation information and cleaning chemical solution stock information related to a plurality of water treatment systems each including a membrane separation device installed therein;

a transmembrane pressure difference prediction step, performed by a processor provided in the management device, of predicting a general trend in a transmembrane pressure difference in each of the plurality of water treatment systems based on the operation information;

a chemical solution cleaning planning step, performed by a chemical solution cleaning planning unit provided in the management device, of devising such a chemical solution cleaning plan that chemical solution cleaning is performed before a period when a value of the transmembrane pressure difference or a rate of change thereof predicted in each of the plurality of water treatment systems in the transmembrane pressure difference prediction step reaches a specified value; and an operating conditions adjustment information generation step of generating operating conditions adjustment information based on which a specified-value reaching period of the transmembrane pressure difference in each of the plurality of water treatment systems is adjusted to be earlier or later than predicted in such a manner that there is no overlap between the specified-value reaching periods of the transmembrane pressure differences predicted in the plurality of water treatment systems in the transmembrane pressure difference prediction step; and a control step of transmitting the operating conditions adjustment information to a management terminal, and causing the plurality of water treatment systems to operate based on the operating conditions adjustment information, so that the transmembrane pressure difference in each of the plurality of water treatment systems is adjusted to be earlier or later than predicted in such a manner that there is no overlap between the specified-value reaching periods of the transmembrane pressure differences predicted in the plurality of water treatment systems, wherein the chemical solution cleaning planning step devises the chemical solution cleaning plan by taking the operating conditions adjustment information generated in the operating conditions adjustment information generation step into account.

\* \* \* \* \*